※United States Patent Office 3,410,763
Patented Nov. 12, 1968

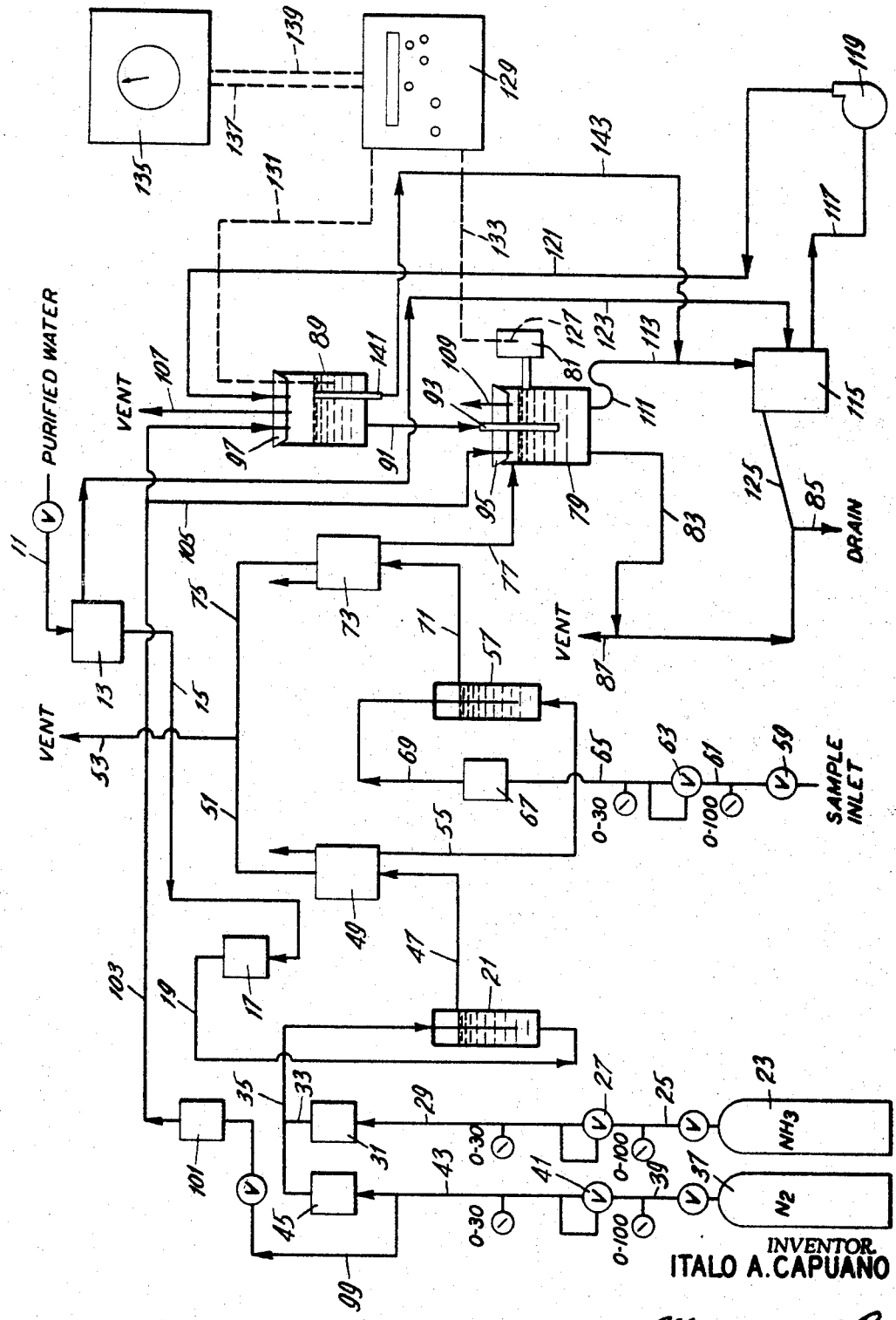

3,410,763
CONTINUOUS POLAROGRAPHIC METHOD
Italo A. Capuano, Orange, Conn., assignor to Union Carbide Corporation, a corporation of New York
Filed Aug. 8, 1963, Ser. No. 300,853
2 Claims. (Cl. 204—1)

The present invention relates to a continuous polarographic analysis and comprehends advanced apparatus and methods for the quantitative and qualitative detection and measurement of relatively low concentrations of specific preselected components of interest comprised in multicomponent mixtures. The apparatus and method of the present invention has broad applicability in the detection and measurement of low parts per million concentrations of any substance which can be ionically supported in an electrolyte suitable for analytical use in a polarographic measuring cell. The present invention is especially useful in gas stream analyses in the chemical manufacturing industry.

The polarograph developed by Heyrovsky and Shikata is now a fairly well-known laboratory instrument which is used to produce a continuous visible indication on a recording chart or the like of a current-voltage curve which is characteristic of a solution undergoing electrolysis between a continually dropping mercury electrode and a reference electrode. See Polarography, 10 Encyclopedia of Chemical Technology 886, The Interscience Encyclopedia Inc., New York. The instrument as such has particular applicability where the electrolysis action involved would, in time, coat and render ineffectual a stationary type electrode of conducting metal or such. Each new drop of mercury forming at the end of a capillary in a measuring cell portion of a polarograph presents to the electrolysis which is underway a clean, new conducting surface for current passage. Controls are provided on conventional polarographic apparatus to permit the selection of desired voltage and sensitivity ranges to suit whatever recorder or indicating instrument is used. The current-voltage indicia are read out proportional to the ion concentration of whatever component of interest is then undergoing electrolysis between the fixed and the mercury dropping electrodes.

While conventional polarographs have enjoyed useful applications and produced many beneficial results in the laboratory, their application to plant stream analyses has, prior to the time of the present invention, not been successfully accomplished. One of the main deficiencies of known polarographic apparatus is the requirement that the mercury used to control dropping measuring electrodes must be gathered at the bottom of the measuring cell, drained out from time to time, cleaned as required and redeposited in some sort of reservoir disposed above the measuring cell portion of the polarograph. Another problem which obtains is that the conventional polarographic mercury drop time of from 2 to 6 seconds is disturbed as to periodicity and drop size by external vibrations encountered in production areas. This affects instrument stability and polarograph diffusion current reproducibility.

The desirable features of the polarographic measuring techniques, particularly the capacity for detecting and measuring low parts per million range concentrations of components of interest, has thus, prior to the time of the present invention, been unavailable to plant stream users for commercial production processes.

In general the present invention will be seen to provide a novel apparatus arrangement wherewith a hitherto unknown continuous analytical technique may be practiced comprising the concurrently performed steps of forming an electrolytic solution containing ions of said component of interest, continuously passing said electrolytic solution containing said ions of said component of interest through a measuring cell portion of a polarographic analyzer, continually dropping liquid mercury drops from a dropping mercury electrode disposed in the electrolytic solution passing through said measuring cell portion of said polarographic analyzer, continuously removing mercury aggregating from said drops from said measuring cell portion, continuously removing impurities from the mercury thus removed, continuously recirculating mercury removed from said measuring cell portion and cleansed to a mercury reservoir disposed above and connecting to said dropping mercury electrode, maintaining applied electric voltage between said dropping mercury electrode and a reference electrode disposed in a reference cell portion of said polarographic analyzer, developing a continuous signal representative of voltage-diffusion current relationship obtaining between the dropping mercury and the reference electrodes, and translating said signal into a continuous visual indication proportional to and representative of the ionic concentration of the component of interest in the electrolytic solution passing through the measuring cell portion of said polarographic analyzer.

It is, therefore, a principle object of this invention to provide a continuous polarographic analyzer apparatus and method adaptable to plant stream use.

It is also an object of this invention to provide a continuously operable polarograph employing an accelerated mercury electrode drop time and a dropping capillary component of larger than usual diameter. A short drop time period makes the diffusion current less sensitive to external vibrations and effects stable, accurate and reproducible readings. The larger than ordinary diameter mercury dropping capillary assures the desired high drop frequency and issues relatively large quantities of mercury per unit time, permitting higher diffusion currents for a given determination.

It is a further object of the present invention to provide such a continuous plant stream type polarographic analyzer which is particularly adaptable to the detection and measurement of low parts per million concentrations of specific components of interest in natural gas streams, process gas streams, and the like with attendant reliability, precision and reproducibility of results unattainable prior to now with other plant stream analytical systems.

With the foregoing and other objects in view, which will become more apparent hereinafter, the invention will now be described in greater particularity and with reference to the appended drawing which is a combination flow diagram and electrical schematic representation of an apparatus embodiment according to the present invention designed and operated to analyze gas streams for 0 to 100 parts per million (p.p.m.) concentrations of hydrogen sulfide. The description hereinafter, while ideally illustrative of the present invention, is also descriptive of a novel method for the polarographic analyses of hydrogen sulfide which is the subject of my copending application entitled Continuous Polarographic Analysis for Low Hydrogen Sulfide Concentrations filed concurrently herewith.

Substantially pure water which has been distilled deionized or the like is supplied continuously to a constant head water reservoir 13 through conduit 11. From reservoir 13 the water is fed through conduit 15, water metering device 17 and conduit 19 into a reactor vessel 21. Anhydrous ammonia $NH_3$ is supplied from a supply source 23 through conduit 25, $NH_3$ pressure reducing valve 27, conduit 29, $NH_3$ metering device 31 and conduits 33 and 35 to reactor vessel 21. Nitrogen $N_2$ is also supplied from a supply source 37 through conduit 39 $N_2$ pressure reducing valve 41, conduit 43, $N_2$ metering device 45 and conduit 35 to reactor vessel 21.

In the reactor vessel 21, the water and the anhydrous ammonia react to form ammonium hydroxide $NH_4OH$ $$2NH_3 + 2H_2O \rightarrow 2NH_4OH$$

The nitrogen feed to reactor vessel 21 serves to remove any dissolved oxygen and to mix the ammoniacal solution in the vessel.

From reactor vessel 21 the ammonium hydroxide thus formed is passed through conduit 47 to a liquid-gas separator 49 from which any gas attending the reaction will escape through conduit 51 to a vent 53. The degassed ammonium hydroxide is then directed through conduit 55 to another reactor vessel 57. A gas sample bearing relatively low concentrations of hydrogen sulfide $H_2S$ for which analysis is desired is directed from sample connection point 59 through conduit 61, sample pressure reducing valve 63, conduit 65, sample metering device 67 and conduit 69 to second reactor vessel 57.

In second reactor vessel 57, the ammonium hydroxide and whatever hydrogen sulfide present in the sample react to form ammonium sulfide $(NH_4)_2S$ and water $H_2O$ $$2NH_4OH + H_2S \rightarrow (NH_4)_2S + 2H_2O$$

From second reactor vessel 57 the ammonium sulfide solution thus formed is passed through conduit 71 to a liquid-gas separator 73 from which any unreacted gas will escape through conduit 75 to the vent 53. The degassed ammonium sulfide solution is then directed through conduit 77 to a measuring cell 79 of an H-shaped polarographic cell pair, the second component of said cell pair being a reference cell 81. The ammonium sulfide solution then passes through measuring cell 79 and out through a discharge conduit 83 to a gravity drain 85 which is vented in the conventional manner as for example at 87.

In addition to the cell pair 79–81 the sample inlet conduit 77 and outlet conduit 83, the polarographic apparatus componentry comprehends the remaining elements shown at the right side of the drawing. A mercury reservoir 89 is disposed above cell pair 79–81 and provides a constant-head source for the mercury dropping capillary which forms the measuring electrode of the apparatus. Reservoir 89 is bottom-connected through a mercury conduit 91 to a mercury dropping capillary 93 arranged in measuring cell 79 and supported by a measuring cell top closure 95. A top closure 97 is also provided on mercury reservoir 89.

Here it may be noted that nitrogen from the nitrogen supply source 37 is also provided to purge the atmosphere above the mercury surface in reservoir 89 and the eletrolyte solution surface in measuring cell 79 through the conduit 39, is nitrogen pressure reducing valve 41, conduit 43, conduit 99, a nitrogen metering device 101, conduit 103 to the reservoir 89 and conduit 105, which bifurcates from conduit 103, to the measuring cell 79. Purge vents 107 and 109 are also provided respectively in mercury reservoir top closure 97 and measuring cell top closure 95 to assure flow continuity of the purging nitrogen.

The design of polarographic measuring cell 79 is such that mercury dropping continually from capillary 93 collects separately from the electrolytic solution passing through the cell and drains continuously through a mercury trap drain 111 at the bottom of the measuring cell, through a mercury drain conduit 113 into mercury collecting tank 115. From the mercury collecting tank, mercury is continuously recirculated through mercury recirculating conduit 117, mercury pump 119 and mercury recirculating conduit 121 through top closure 97 back into the mercury reservoir 89. An overflow means 141 is provided in the reservoir 89 and arranged to drain off mercury over a preselected level to the collecting tank 115 through a mercury overflow conduit 143 which connects to mercury drain conduit 113. While it is in the collecting tank 115, the mercury is continuously washed of impurities with water from pure water supply conduit 11, through a purging water conduit 123 which connects into mercury collecting tank 115 as shown on the drawing. The mercury in collecting tank 115 may be vigorously scrubbed with a magnetic stirrer or the like in the event that the pure water stream alone is found inadequate to free the used mercury of ammonium hydroxide-ammonium sulfide impurity and to remove any surface films of mercuric sulfide which may occur. A mercury purging water drain conduit 125 is provided to continuously remove the purging water from tank 115 to drain 85, described before.

Also in the illustrated arrangement of apparatus, the polarograph reference cell is provided with a reference electrode 127 which may be for instance a customarily used saturate calomel electrode. A conventional polarograph potential source and current detector 129 is arranged to provide the desired potential across the electrodes, respectively the mercury in reservoir 89 through a conductor 131 and the reference electrode 127 through a conductor 133. Current and voltage signals produced during analyses are transmitted to a conventional polarograph voltage-current indicator/recorder 135 through conductors 137–139.

Conventional valves and gages used have been illustrated for purposes of clarity but not designated numerically since their uses will be readily apparent to persons familiar with the art.

During an analysis a diffusion current proportional to the potential applied across the mercury and saturated calomel electrodes is developed in the polarographic cell, detected in device 129 and translated along with a voltage signal to indicator recorder 135. The predominant electrode reaction responsible for the diffusion current is believed to be $$H_g^\circ + S^{--} \rightleftharpoons H_gS + 2e$$

The sulfide ion in a strongly basic medium produces a reversible anodic wave due to the oxidation of mercury to mercuric sulfide and the anodic diffusion current is directly proportional to the sulfide ion concentration and thus indicative of the concentration of the hydrogen sulfide present in the sample being analyzed.

EXAMPLE I

In a typical application of the method and apparatus of the present invention and with reference to the illustrative drawing, purified water at a flow rate of 26 milliliters per minute from water reservoir 13 was reacted continuously in reactor vessel 21 with anhydrous ammonia metered at a flow rate of 80 milliliters per minute. A flow of 460 milliliters per minute of pure nitrogen was simultaneously passed into the water-anhydrous ammonia reactor vessel 21 to remove oxygen and to mix the ammoniacal solution. After degassification in liquid-gas separator 49, the ammonium hydroxide stream was introduced into reactor vessel 57 simultaneously with a controlled sample stream from 59 flowing at a rate of 500 milliliters per minute. The reaction product, an ammonium sulfide solution, was passed through liquid-gas separator 73 and then through the polarograph measuring cell 79. In this particular application, a mercury dropping capillary was fabricated from a 4 inch long piece of thermometer capillary stock with an elliptical bore having a major axis dimension of 0.045 millimeter and a minor axis dimension of 0.012 millimeter. Mercury reservoir 89 was adjusted for a static head on the capillary of about 8 inches to deliver a mercury mass flow rate of 54 milligrams per second at a drop interval of 0.35 second. The mercury collected in tank 115 was continuously washed with a stream of purified water through purging water conduit 123 vigorously agitated with the collected mercury by means of a magnetic stirrer. The device 129 was adjusted to apply a fixed potential of $-0.6$ volt D.C. to the dropping mercury electrode, referred to a saturated calomel electrode 127. A positive displacement metering pump 119 was used to recirculate the washed mercury to the reservoir 89. The voltage-current indicia produced was recorded on a commercially available one millivolt input circular chart recorder.

The aforedescribed arrangement of apparatus and operating conditions was used with outstandingly successful results in analyses of 0–10 parts per million of hydrogen sulfide in nitrogen. Accurately prepared samples containing hydrogen sulfide concentrations within this range were analyzed continually and the results were highly accurate and consistently reproducible.

EXAMPLE II

In a test to evaluate the long term stability of the system according to the invention under plant operating conditions an arrangement similar to that of Example I was constructed in an operating plant area adjacent to some continuous production gas separation compressors which operated with relatively high attendant vibration and noise. A sample was prepared by admixing 50 parts per million by volume of hydrogen sulfide in nitrogen and this sample was continuously passed through the analyzer for a day-long test at a flow rate of 500 milliliters per minute. Water flow rate was 42 milliliters per minute; ammonia flow rate 80 milliliters per minute; nitrogen flow rate 460 milliliters per minute; and the mercury drop frequency was adjusted to 0.1 second. Table I below presents the results of this experiment, showing the readout value of the concentration at hourly intervals over the test duration, and illustrates the constant accuracy of the analysis. Even as to differences found, it will be appreciated by persons familiar with the art, the reading may well be perfectly accurate, the difference from the prepared 50 parts per million sample being attributable to incomplete admixing or adventitious over-concentrations of the hydrogen sulfide in the sample stream nitrogen.

TABLE I.—LONG TERM STABILITY OF THE CONTINUOUS POLAROGRAPHIC ANALYZER IN $H_2S$ ANALYSES

| Hours | $H^2S$ p.p.m. by Volume | | |
|---|---|---|---|
| | Added | Found | Difference |
| 0 | 50.0 | 50.0 | 0.0 |
| 1 | | 49.0 | −1.0 |
| 2 | | 50.5 | +0.5 |
| 3 | | 50.0 | 0.0 |
| 4 | | 49.0 | −1.0 |
| 5 | | 50.0 | 0.0 |
| 6 | | 51.0 | +1.0 |
| 7 | | 50.5 | −0.5 |

EXAMPLE III

In a test to ascertain the effect of the presence in sample streams of other substances which might be encountered, typical refinery gas stream constituents and constituent groups were added in their normally occurring concentrations to samples of hydrogen sulfide-nitrogen prepared as in Example II, i.e., 50 parts per million hydrogen sulfide in nitrogen. Operating conditions were the same as in Example II. The effect of the presence of these other substances on the analyses for hydrogen sulfide concentrations was found to be negligible as can be seen from the data presented in Table II below.

TABLE II.—EFFECT OF VARIOUS GASES ON THE POLAROGRAPHIC DETERMINATION OF HYDROGEN SULFIDE

| Sample No. | Impurity Added | Percent Conc. | $H^2S$ p.p.m. by Volume | | |
|---|---|---|---|---|---|
| | | | Added | Found | Diff. |
| 1 | Carbon Dioxide | 0.05 | 50.0 | 51.0 | +1.0 |
| 2 | Carbon Monoxide | 1.4 | 50.0 | 50.0 | 0.0 |
| 3 | 1,3 butadiene | 1.0 | 50.0 | 51.0 | +1.0 |
| 4 | Ethane | 21.2 | 50.0 | 52.0 | +2.0 |
| | Ethylene | 5.7 | | | |
| | Propane | 5.3 | | | |
| 5 | Methane | 33.5 | 50.0 | 51.0 | +1.0 |
| | Butane | 1.5 | | | |
| | Isobutane | 1.0 | | | |

The foregoing examples and the description itself have been related in respect of hydrogen sulfide analyses. It will be apparent now however, in the light of this teaching, that the invention may be practiced towards analyses for any trace components of interest, provided they can be ionically passed through the measuring cell of the polarographic apparatus in a suitable supporting electrolyte.

It has been found that trace quantities of copper can be successfully detected and measured in a supporting electrolyte of 10 percent sulphuric acid $H_2SO_4$ with an applied voltage of $-.43$ volt on the mercury.

Copper and cobalt concentration can also be measured concurrently (with two applied voltage values) when reacted with phenyl hydrazine. This combination may also be analyzed in a technique involving reaction with ammonium hydroxide provided that the applied potential need not be set high enough to decompose the ammonium hydroxide.

The preparatory steps required in processing a sample to be analyzed may, in a given instance, be less involved or more involved than those attending hydrogen sulfide. It should also be noted here that hydrogen sulfide analysis itself may, in certain instances, require performance of additional preparatory steps such as the elimination of oxygen which is known to interfere with hydrogen determination or the elimination or neutralization of any other occurring substances which may have an interfering effect on the analyses. In the polarographic method the concentration and conductance of the supporting electrolyte have a definite influence on the diffusion current. Thus it is important that any materials occurring in the sample stream which will react to produce ions other than those of the component of interest be removed or neutralized chemically or physically in a preparatory step lest they interfere with the sought determination. The applications and extensions of the present invention are therefore limited only by the chemical skills of the analyst in producing the necessary supporting electrolyte bearing the ionic concentrations to be detected and measured. Experimental work has shown that full scale analyses can be performed easily in any desired parts per million range from up to many hundred parts per million to full scale readouts of 10 parts per million and lower by merely varying the sample and reagent or supporting electrolyte flow rates. Lowering the sample flow rate and/or increasing the supporting fluid flow rate permits determinations in the higher concentration ranges. Decreasing the supporting fluid flow rate and/or increasing the sample flow rate extends the determination capability to the lower concentration ranges.

Temperature at which analyses are conducted also affects the diffusion current. The diffusion current varies approximately 2 percent per degree Centigrade change in temperature, necessitating system temperature control. The illustrative experimental work described hereinbefore was performed at a maintained temperature of 30° Centigrade.

From the above-described and other extensive experimental work, it has been determined that the present invention constitutes a significant contribution to the art, providing a novel method and apparatus for the polarographic determination of components of interest in multicomponent mixtures and compounds containing no interfering substances. Such interfering substances as occur may be removed or neutralized in preparatory steps specific to the analysis desired.

The description, examples and appended drawing hereof are intended for illustration of the invention and not in any limiting sense, it being considered that persons skilled in the art will, in the light of this teaching, employ variations and modifications of what is described which will be within the spirit of this invention and within the scope of the appended claims.

What is claimed is:

1. A method for continuous qualitative and quantitative determination of concentration of a preselected component of interest occurring in a multicomponent mixture which method comprises the concurrently performed steps of forming an electrolytic solution containing ions of said component of interest; continuously passing said electrolytic solution containing said ions of said component of interest through a measuring cell portion of a polarographic analyzer; continually dropping liquid mercury drops from a dropping mercury electrode disposed in the electrolytic solution passing through said measuring cell portion of said polarographic analyzer at a frequency of from about 0.1 to about 0.4 second; continuously removing mercury aggregating from said drops from said measuring cell portion; continuously removing impurities from the mercury thus removed; continuously recirclating mercury removed from said measuring cell portion and cleansed to a mercury reservoir disposed above and connecting to said dropping mercury electrode; maintaining applied electric voltage between said dropping mercury electrode and a reference electrode disposed in a reference cell portion of said polarographic analyzer; developing a continuous signal representative of voltage-diffusion current relationship obtaining between the dropping mercury and the reference electrodes; and translating said signal into a continuous sensible indication proportional to and representative of the ionic concentration of the component of interest in the electrolytic solution passing through the measuring cell portion of said polarographic analyzer.

2. A method for continuous qualitative and quantitative determination of concentration of at least one preselected component of interest occurring in a multicomponent mixture which method comprises the concurrently performed steps of continuously admixing said multicomponent mixture with a reagent reactable with the preselected component of interest to produce an electrolytic solution containing ions of said component of interest; removing from said electrolytic solution such other components occurring herein as may interfere with a polarographic diffusion current passing through said electrolytic solution proportional to ionic concentration of the component of interest; continuously passing said electrolytic solution containing said ions of said component of interest through a measuring cell portion of a polarographic analyzer; continually dropping liquid mercury drops from a dropping mercury electrode disposed in the electrolytic solution passing through said measuring cell portion of said polarographic analyzer at a frequency of from about 0.1 to about 0.4 second; continuously removing mercury aggregating from said drops from said measuring cell portion; continuously removing impurities from the mercury thus removed; continuously recirculating mercury removed from said measuring cell portion and cleansed to a mercury reservoir disposed above and connecting to said dropping mercury electrode; maintaining applied electric voltage between said dropping mercury electrode and a reference electrode disposed in a reference cell portion of said polarographic analyzer; developing a continuous signal representative of voltage-diffusion current relationship obtaining between the dropping mercury and the reference electrodes; and translating said signal into a continuous visual indication proportional to and representative of the ionic concentration of the component of interest in the electrolytic solution passing through the measuring cell portion of said polarographic analyzer.

References Cited

UNITED STATES PATENTS

| | | | |
|---|---|---|---|
| 3,091,579 | 5/1963 | Basilevsky | 204—99 |
| 3,210,261 | 10/1965 | Tyler | 204—195 |

FOREIGN PATENTS 631,403 11/1949 Great Britain.

OTHER REFERENCES

Kolthoff et al.: "Polarography," 2nd edition, volume 1, 1952, p. 354.

Kolthoff et al.: "Polarography," 2nd edition, 1952, pp. 314, 315, 338, 584 and 585.

Meites: "Polarographic Techniques," 1955, pp. 20 and 32.

HOWARD S. WILLIAMS, *Primary Examiner.*

T. TUNG, *Assistant Examiner.*

UNITED STATES PATENT OFFICE
CERTIFICATE OF CORRECTION

Patent No. 3,410,763                                                          November 12, 1968

Italo A. Capuano

It is certified that error appears in the above identified patent and that said Letters Patent are hereby corrected as shown below:

Column 8, between lines 6 and 7 insert -- ing mercury aggregating from said drops from said --.

Signed and sealed this 10th day of March 1970.

(SEAL)
Attest:

Edward M. Fletcher, Jr.                                    WILLIAM E. SCHUYLER, JR.
Attesting Officer                                                    Commissioner of Patents